(12) United States Patent
Droux et al.

(10) Patent No.: US 7,733,890 B1
(45) Date of Patent: Jun. 8, 2010

(54) NETWORK INTERFACE CARD RESOURCE MAPPING TO VIRTUAL NETWORK INTERFACE CARDS

(75) Inventors: Nicolas G. Droux, San Jose, CA (US); Sunay Tripathi, San Jose, CA (US); Thirumalai Srinivasan, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 917 days.

(21) Appl. No.: 11/112,063

(22) Filed: Apr. 22, 2005

(51) Int. Cl.
*H04L 12/28* (2006.01)
*H04J 3/16* (2006.01)

(52) U.S. Cl. ........................ 370/412; 370/463

(58) Field of Classification Search ............... 370/422, 370/389, 338, 400, 412, 396, 347, 395.53, 370/401, 403, 404, 405, 406, 409; 711/203–209
See application file for complete search history.

(56) References Cited

U.S. PATENT DOCUMENTS

| | | | | |
|---|---|---|---|---|
| 5,909,564 | A | * | 6/1999 | Alexander et al. .......... 710/316 |
| 6,041,053 | A | | 3/2000 | Douceur et al. |
| 6,070,219 | A | * | 5/2000 | McAlpine et al. ........... 710/263 |
| 6,163,539 | A | | 12/2000 | Alexander et al. |
| 6,477,643 | B1 | * | 11/2002 | Vorbach et al. ............. 713/100 |
| 6,600,721 | B2 | | 7/2003 | Edholm |
| 6,714,960 | B1 | | 3/2004 | Bitar et al. |
| 6,757,731 | B1 | | 6/2004 | Barnes et al. |
| 6,831,893 | B1 | | 12/2004 | Ben Nun et al. |
| 6,859,841 | B2 | | 2/2005 | Narad et al. |
| 6,944,168 | B2 | | 9/2005 | Paatela et al. |
| 6,963,932 | B2 | * | 11/2005 | Bhat ........................... 709/249 |
| 7,003,189 | B1 | * | 2/2006 | Fang et al. .................... 385/16 |
| 7,046,665 | B1 | | 5/2006 | Walrand et al. |
| 7,177,311 | B1 | | 2/2007 | Hussain et al. |
| 7,260,102 | B2 | | 8/2007 | Mehrvar et al. |
| 7,313,142 | B2 | | 12/2007 | Matsuo et al. |
| 7,356,818 | B2 | | 4/2008 | Carollo et al. |
| 7,502,884 | B1 | * | 3/2009 | Shah et al. .................. 710/316 |
| 2002/0052972 | A1 | * | 5/2002 | Yim ........................... 709/245 |
| 2003/0037154 | A1 | | 2/2003 | Poggio et al. |
| 2004/0267866 | A1 | | 12/2004 | Carollo et al. |
| 2005/0135243 | A1 | | 6/2005 | Lee et al. |
| 2005/0138620 | A1 | | 6/2005 | Lewites |
| 2006/0041667 | A1 | | 2/2006 | Ahn et al. |
| 2006/0070066 | A1 | | 3/2006 | Grobman |
| 2006/0174324 | A1 | | 8/2006 | Zur et al. |
| 2008/0144635 | A1 | | 6/2008 | Carollo et al. |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss.4, Oct. 2001, (11 Pages).

* cited by examiner

*Primary Examiner*—Chirag G Shah
*Assistant Examiner*—Nima Mahmoudzadeh
(74) *Attorney, Agent, or Firm*—Osha • Liang LLP

(57) ABSTRACT

Virtual network interfaces receive data from distinct subsets of receive rings of a network interface card. In other words, each virtual network interface "owns" its own subset of receive rings of the network interface card. The assignment of virtual network interfaces to particular receive rings of the network interface cards may be determined, for example, dynamically, based on priorities associated with particular virtual network interfaces, based on function type, and/or based on service need.

14 Claims, 5 Drawing Sheets

NETWORK INTERFACE CARD RESOURCE MAPPING TO VIRTUAL NETWORK INTERFACE CARDS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,367; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Dynamically Isolating Affected Services Under Denial of Service Attack" Ser. No. 11/112,158; "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,222; "Dynamic Hardware Classification Engine Updating for a Network Interface" Ser. No. 11/112,934; "Network Interface Decryption and Classification Technique" Ser. No. 11/112,436; "Method and Apparatus for Enforcing Resource Utilization of a Container" 11/112,910; "Method and Apparatus for Enforcing Packet Destination Specific Priority Using Threads" Ser. No. 11/112,584; "Method and Apparatus for Processing Network Traffic Associated with Specific Protocols" Ser. No. 11/112,228; and "Method and Apparatus for Enforcing Bandwidth Utilization of a Virtual Serialization Queue" Ser. No. 11/112,322.

BACKGROUND OF INVENTION

In modern computing environments, computer systems are often required to communicate with other computer systems to perform any one or more of a vast number of different functions. Such communication may involve one computer system requiring the services or resources of another computer system. Referring to FIG. 1, in cases where multiple computer systems are not or cannot be directly and physically connected to one another due to, for example, being in different or remote locations, communication among multiple computer systems 10, 12, 14, 16, 18, 20 is facilitated by one or more networks 22 (e.g., the Internet) to which the multiple computer systems 10, 12, 14, 16, 18, 20 are operatively connected.

When a computer system sends data to a network for subsequent transmission to another computer system, that data is typically sent as numerous packets of data that can be universally recognized and handled by at least those networks that play a role in facilitating the transfer of that data between the computer systems (the propagation of packets in one or more networks hereinafter referred to generally as "network traffic"). A packet is typically formed of a header portion and a payload portion. The header portion may include information regarding, for example, an address of the sending system, an address of the desired receiving system, a size of the packet, a transport protocol used to transmit the packet, or other information identifying or characterizing the packet. The payload portion includes the actual data (e.g., data needed by the receiving system to perform a particular computation) to be transmitted from the sending system over the network to the receiving system.

To facilitate the sending and receiving of network traffic, a computer system typically includes or is otherwise connected to a network interface such as, for example, a hardware component known as a "network interface card" (NIC). FIG. 2 shows a typical computing environment having a "host" system 30 in operative connection with a network interface card 32. As shown in FIG. 2, the host system 30 includes a computing resource (e.g., a central processing unit (CPU), a temporary data structure) 34 that is operatively connected to the network interface card 32.

The network interface card 32, which is connected to a network 36, includes a classifier 38, receive rings (e.g., first-in, first-out queues) 40 that are each associated with a set of buffers, and send rings 42 used to transmit outgoing network traffic. Incoming network traffic is analyzed by the classifier 38 and assigned to one of the receive rings 40 based on, for example, an identification (e.g., an internet protocol (IP) address) or connection type (e.g., transmission control protocol (TCP)) of a particular packet. Upon assignment by the classifier 38 of a particular packet to one of the receive rings 40, the packet is forwarded to that receive ring and a corresponding interrupt may be issued to the computing resource 34 to indicate the receipt of new data. Depending on, for example, a priority attributed to a particular receive ring, the computing resource 34 may instantiate a thread or use a current thread to retrieve the new data forwarded to that particular receive ring. In other cases, the computing resource 34 may not actively retrieve new data forwarded to a particular receive ring, and instead, may simply wait for new data to be processed through that particular receive ring.

SUMMARY OF INVENTION

According to one aspect of one or more embodiments of the present invention, a system comprises: a plurality of virtual network interfaces; and a physical network interface operatively connected to the plurality of virtual network interfaces and having a plurality of receive rings arranged to propagate data between the plurality of virtual network interfaces and a network operatively connected to the physical network interface, where each of the plurality of virtual network interfaces is assigned to a different subset of the plurality of receive rings.

According to one aspect of one or more embodiments of the present invention, a method of processing network traffic in a host system comprises: receiving a data packet from a network; processing the data packet to obtain identification information of the data packet; and forwarding the data packet to one of a plurality of receive rings of a physical network interface based on the obtained identification, where each of the plurality of receive rings is associated with a particular one of a plurality of virtual network interfaces present in the host system.

According to one aspect of one or more embodiments of the present invention, a system comprises: a plurality of virtual network interfaces; and a network interface card operatively connected to a network and each of the plurality of virtual network interfaces, where the network interface card comprises (i) a hardware classifier arranged to receive and analyze an incoming data packet from the network, and (ii) a plurality of receive rings, where the hardware classifier forwards the data packet to one of the plurality of receive rings based on an assignment of the one of the plurality of receive rings to a particular one of the plurality of virtual network interfaces.

Other aspects and advantages of the invention will be apparent from the following description and the appended claims.

DETAILED DESCRIPTION

Figure 1:
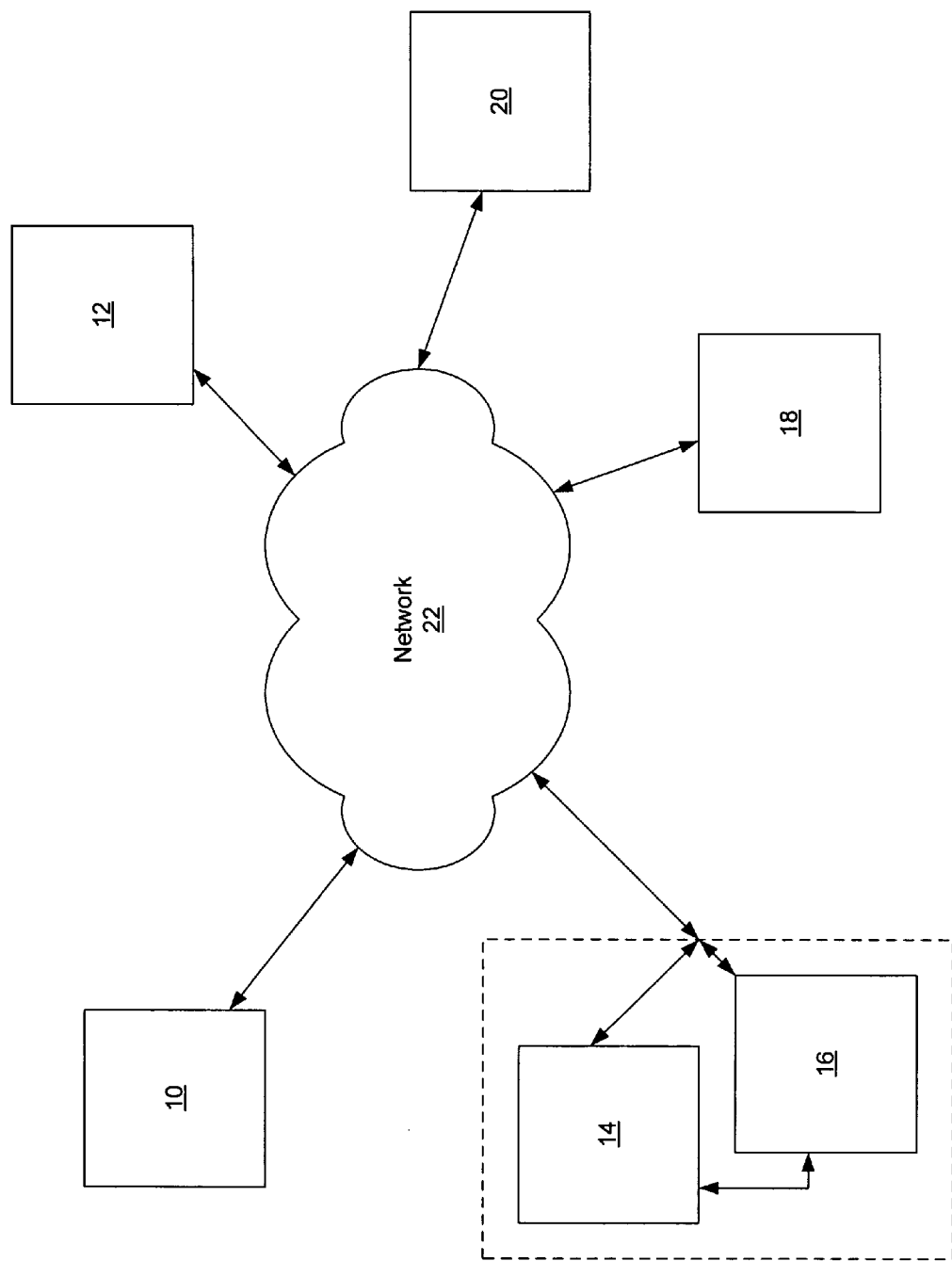
FIG. 1 shows a typical networked computing environment.
Figure 2:
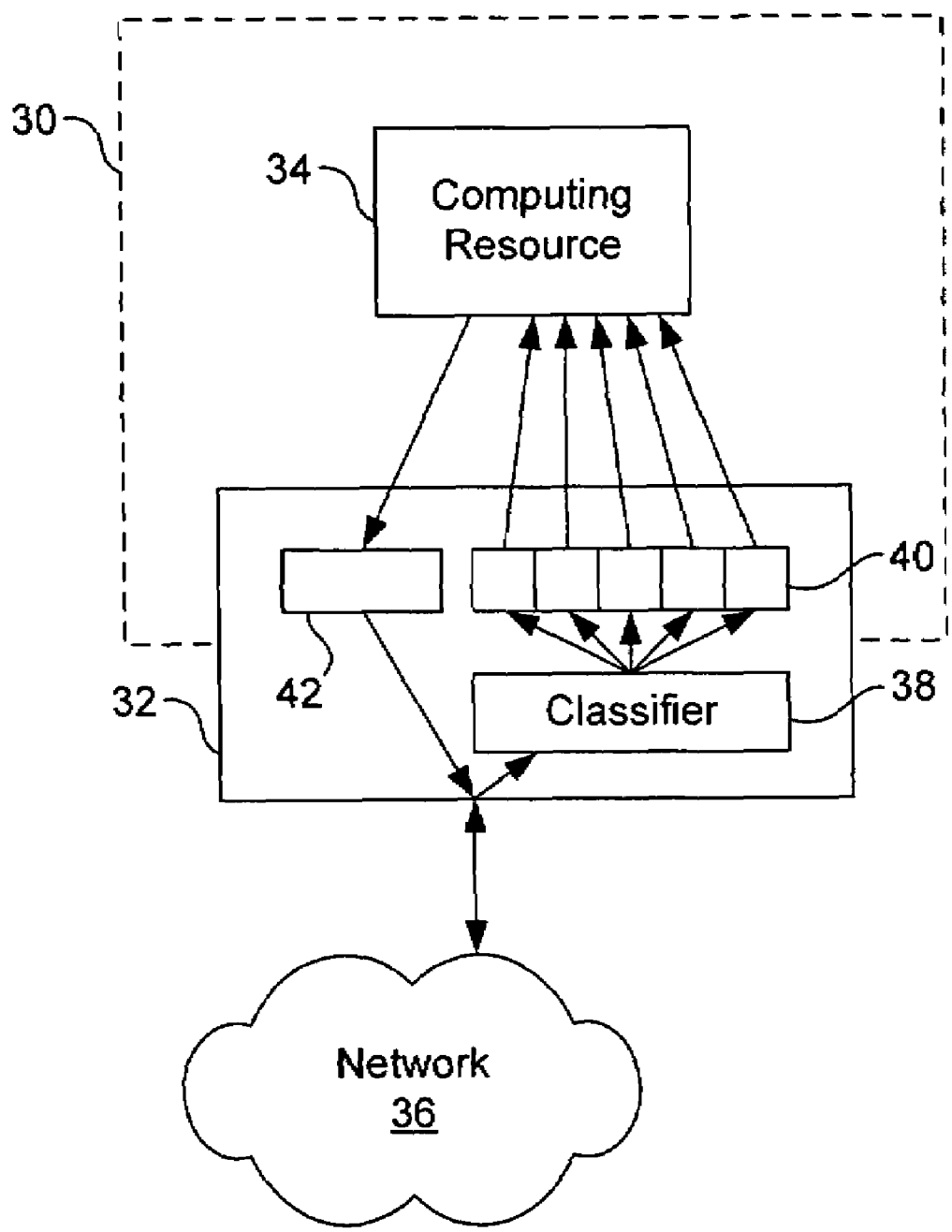
FIG. 2 shows a portion of a typical networked computing environment.

Exemplary embodiments of the present invention will be described with reference to the accompanying drawings. Like items in the drawings are shown with the same reference numbers. In the following description of the various embodiments of the present invention, numerous specific details are set forth in order to provide a more thorough understanding of the present invention. However, it will be apparent to one of ordinary skill in the art that the present invention may be practiced without these specific details. In other instances, well-known features have not been described in detail to avoid obscuring the description of the present invention.

Embodiments of the present invention relate to a technique for processing network traffic in a computing environment in which multiple computing resources share a single network interface.

Figure 3:
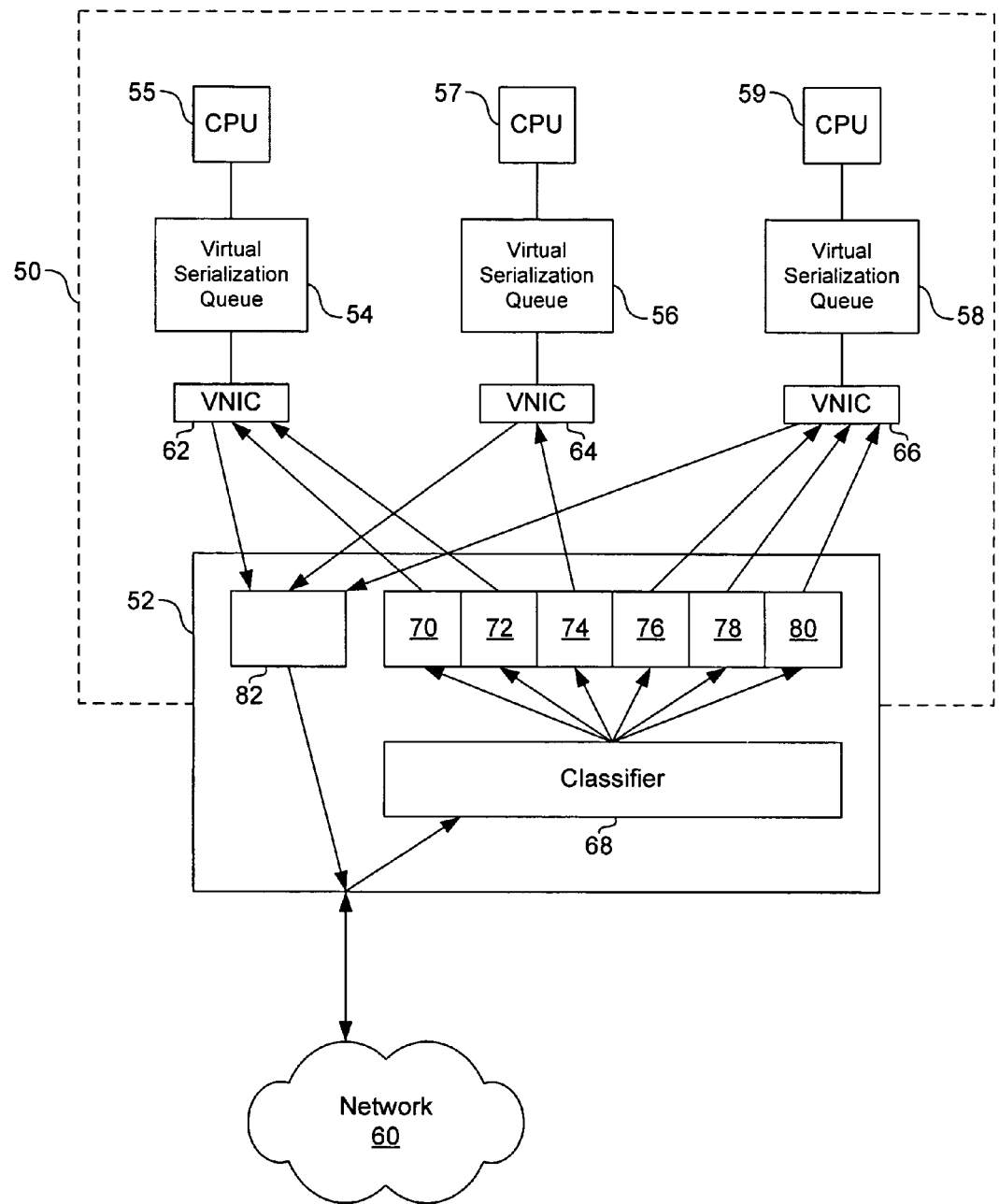
FIG. 3 shows a portion of a networked computing environment in accordance with an embodiment of the present invention.

FIG. 3 shows a portion of an exemplary computing environment in accordance with an embodiment of the present invention. In FIG. 3, a host system 50 is in operative connection with a network interface card 52. The host system 52 includes a plurality of virtual network interface cards 62, 64, 66 (each labeled in FIG. 3 as "VNIC") that are interfaced to a network (e.g., a local area network (LAN), a wide area network (WAN), a wireless network) 60 by the network interface card 52.

In one or more embodiments of the present invention, each virtual network interface card 62, 64, 66 is associated with at least one virtual serialization queue 54, 56, 58. Each serialization queue 54, 56, 58 corresponds to a data structure having at least two queues: an inbound queue and an outbound queue. Each of the queues within the virtual serialization queues 54, 56, 58 may be implemented as first-in, first-out (FIFO) queues. Further, each virtual serialization queue 54, 56, 58 may be configured to send and receive packets from associated virtual network interface cards 62, 64, 66. In addition, each virtual serialization queue 54, 56, 58 is configured to send and receive packets from one or more associated packet destinations (e.g., services and/or containers of the host system 50). Further, each virtual serialization queue 54, 56, 58 may be bound to a computing resource (e.g., a central processing unit (CPU)) of the host system 50. As shown in FIG. 3, each virtual serialization queue 54, 56, 58 is bound to a CPU 55, 57, 59, respectively. Although FIG. 3 shows a one-to-one relationship between virtual serialization queues and CPUs, those skilled in the art will appreciate that any number of virtual serialization queues may be bound to a CPU. Further, those skilled in the art will appreciate that any number of virtual serialization queues may be bound to a virtual network interface card.

As described above, each of the plurality of virtual serialization queues 54, 56, 58 is respectively associated with a "virtual" network interface card 62, 64, 66 (labeled in FIG. 3 as "VNIC"). The virtual network interface cards 62, 64, 66 provide an abstraction layer between the physical network interface card 52 and various packet destinations (e.g., services and/or containers of the host system 50) present in the host system 50. In other words, each virtual network interface card 62, 64, 66 operates like a physical network interface card. For example, in one embodiment of the present invention, each virtual network interface card 62, 64, 66 may be associated with one or more Internet Protocol (IP) addresses, one or more ports, and/or configured to handle one or more protocol types. Thus, while the host system 50 may be operatively connected to a single physical network interface card 52, packet destinations in the host system 50 (e.g., services and/or containers of the host system 50) operate as if each packet destination has its own physical network interface card.

The network interface card 52, which is connected to the network 60, includes a classifier (e.g., a hardware classifier) 68, receive rings (e.g., first-in, first-out queues) 70, 72, 74, 76, 78, 80 that are each associated with a set of buffers, and send rings 82 used to transmit outgoing network traffic. Incoming network traffic is analyzed by the classifier 68 and assigned to one of the receive rings 70, 72, 74, 76, 78, 80 based on, for example, an identification (e.g., a destination/source internet protocol (IP) address) or connection type (e.g., transmission control protocol (TCP)) of a particular packet.

Instead of the virtual network interface cards 62, 64, 66 sharing the receive rings 70, 72, 74, 76, 78, 80 of the network interface card 52, each virtual network interface card 62, 64, 66, and hence, each of the plurality of virtual serialization queues 54, 56, 58, is assigned to a particular and distinct subset of the receive rings 70, 72, 74, 76, 78, 80. In other words, each virtual network interface card 62, 64, 66 "owns" its own group of resources of the network interface card 52. Thus, in effect, the network interface card 52 is partitioned among the plurality of virtual network interface cards 62, 64, 66 based on the fact that the network interface card 52 has separate and assignable receiver resources (e.g., receive rings 70, 72, 74, 76, 78, 80).

Those skilled in the art will note that because a virtual network interface card processes network traffic from a particular subset of resources of a physical network interface card, performance of a computing resource to which the virtual network interface card is assigned may not be impacted by bandwidth consumption or traffic of another virtual network interface card connected to the physical network interface card.

Further, in one or more embodiments of the present invention, a network interface may be implemented without a physical network interface card. For example, in one or more embodiments of the present invention, a network interface may be implemented in software.

The assignment of each receive ring 70, 72, 74, 76, 78, 80 to a particular one of the plurality of virtual network interface cards 62, 64, 66 may occur according to any one or combination of various user-defined or system-defined relationships. For example, the classifier 68 may be programmed such that all incoming network traffic for a particular IP address goes to receive ring 72, where receive ring 72 is assigned to virtual network interface card 62. In one or more embodiments of the present invention, the network interface card 52 may be dynamically programmed so as to dynamically partition particular resources (e.g., receive rings 70, 72, 74, 76, 78, 80) of the network interface card 52 among the plurality of virtual network interface cards 62, 64, 66.

Further, in one or more embodiments of the present invention, bandwidth associated with a particular subset of network interface card resources may be assigned to a particular virtual network interface card based on priority and/or need. For example, referring to FIG. 3, packet processing on virtual network interface card 66 is of higher priority than packet processing on virtual network interface card 64 as three receive rings 76, 78, 80 are assigned to virtual network interface card 66 while only one receive ring 74 is assigned to virtual network interface card 64.

Figure 4:
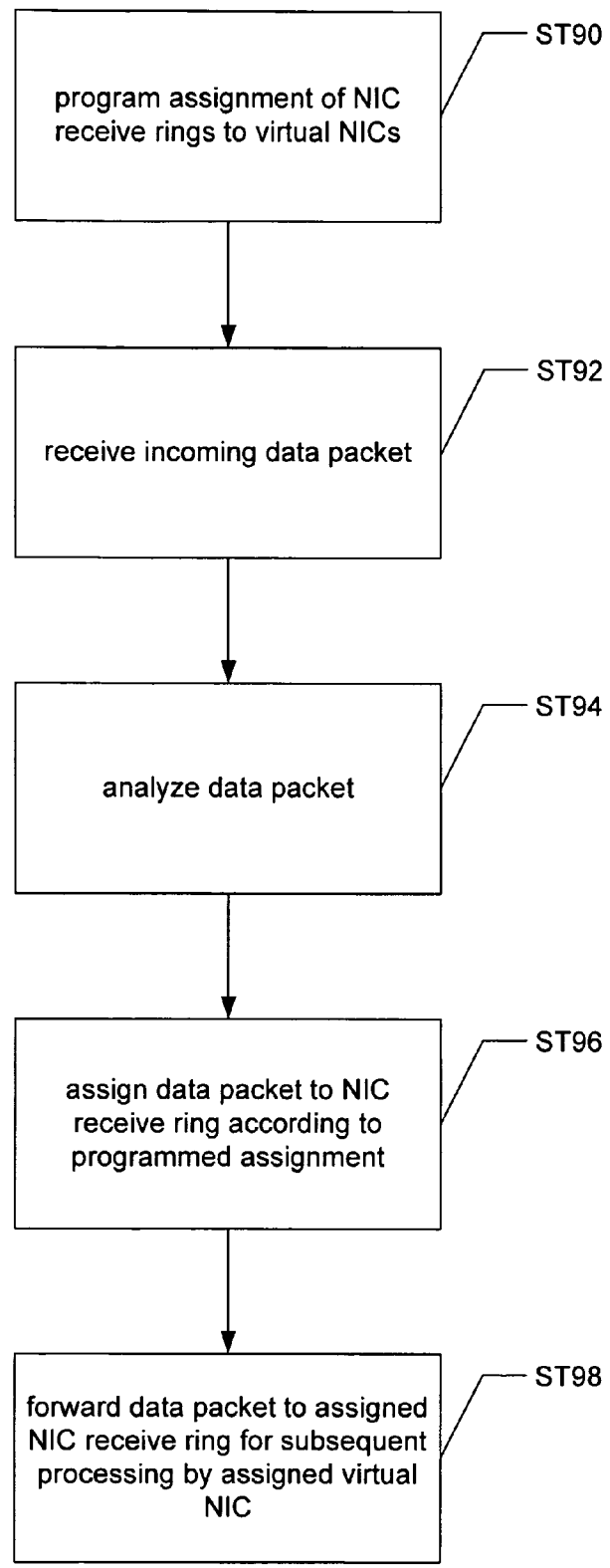
FIG. 4 shows a flow process in accordance with an embodiment of the present invention.

FIG. 4 shows an exemplary flow process in accordance with an embodiment of the present invention. Initially, either at start-up or dynamically during operation, particular hardware resources (e.g., receive rings) of a network interface card are assigned to particular virtual network interface cards that are each assigned to a particular virtual serialization queue ST90. As described above, such assignment may be based on, for example, a priority associated with a particular virtual network interface card or virtual serialization queue.

After the assignment of the receive rings of the network interface card, an incoming data packet is received ST92. Upon receipt of the incoming data packet in ST92, the packet is analyzed ST94 (by, for example, the classifier 58 shown in FIG. 3). Such analysis may involve examining the header portion of the packet for particular identification or characterization information. Depending on the information gathered in ST94, the packet is assigned to a particular receive ring according to the programmed assignment in ST96. For example, in ST90, if receive ring A was assigned to virtual network interface card 1 (which is associated with virtual serialization queue A), then when a packet is analyzed as belonging for processing to virtual network interface card 1, the packet is assigned to receive ring A. Upon analysis of the packet, the packet is forwarded to the appropriate receive ring for subsequent processing by the assigned virtual network interface card ST98.

Figure 5:
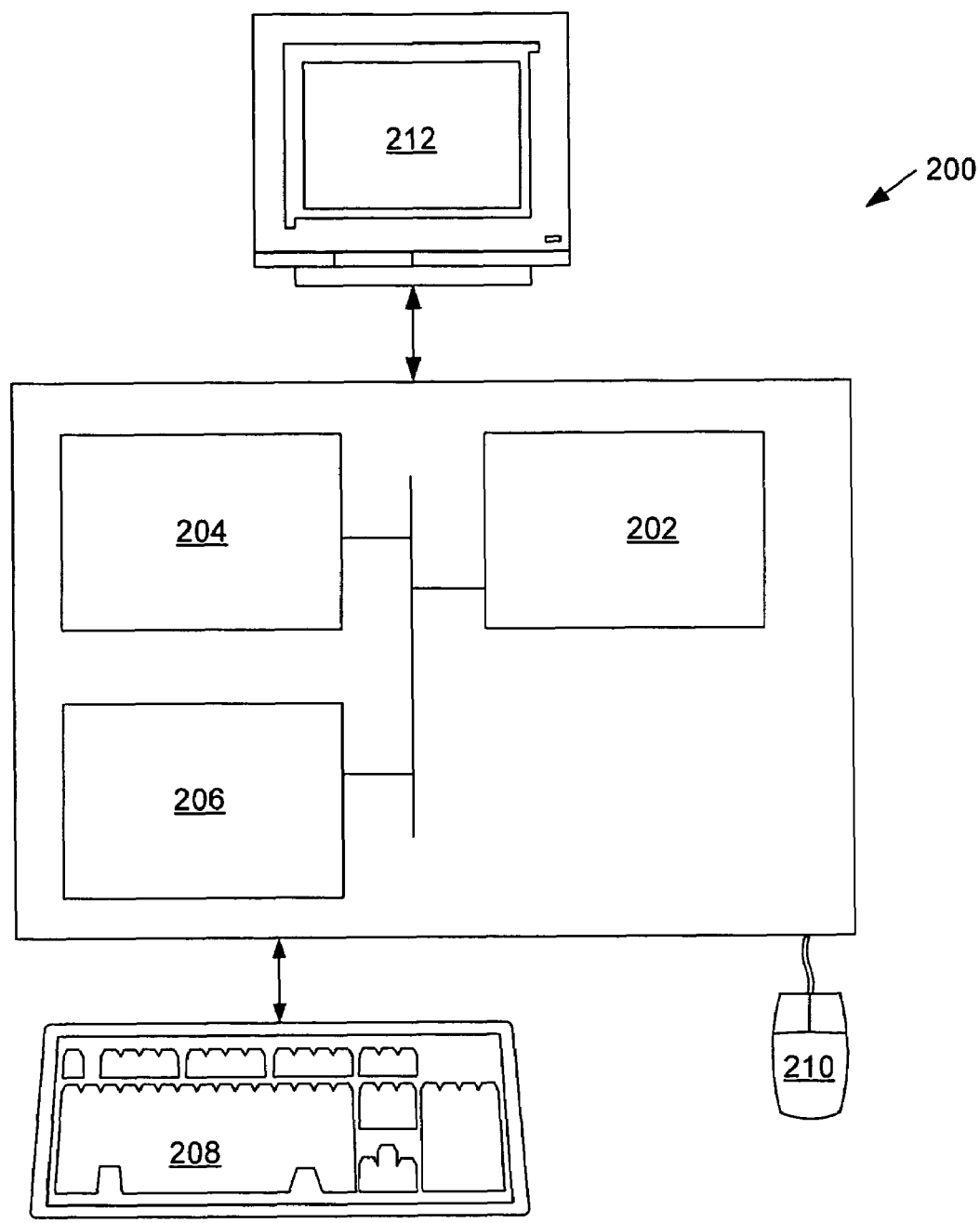
FIG. 5 shows a computer system in accordance with an embodiment of the present invention.

An embodiment of the present invention may be associated with virtually any type of computer system regardless of the platform being used. For example, as shown in FIG. 5, a networked computer system 200 includes a processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform embodiments of the invention may be stored on a computer readable medium such as a compact disc (CD), a diskette, a tape, a file, or any other computer-readable storage device.

Advantages of the present invention may include one or more of the following. In one or more embodiments of the present invention, because a virtual network interface card processes network traffic from a particular subset of resources of a physical network interface card, performance of a computing resource to which the virtual network interface card is assigned may not be impacted by bandwidth consumption or traffic of another virtual network interface card connected to the physical network interface card.

In one or more embodiments of the present invention, assignment of particular hardware resource of a network interface card to particular virtual network interface cards associated with distinct computing resources may allow different priorities to be assigned to the particular virtual network interface cards.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
 a plurality of virtual network interface cards, wherein each of the virtual network interface cards is associated with a distinct internet protocol (IP) address; and
 a physical network interface operatively connected to the plurality of virtual network interface cards and having a plurality of receive rings arranged to propagate data between the plurality of virtual network interfaces and a network operatively connected to the physical network interface,
 wherein each of the plurality of virtual network interfaces is assigned to a different subset of the plurality of receive rings;
 wherein at least one of the plurality of virtual network interface cards is associated with at least one virtual serialization queue; and
 wherein the at least one virtual serialization queue is associated with at least one of a service and a container of the system.

2. The system of claim 1, the physical network interface comprising a network interface card.

3. The system of claim 1, wherein at least one of the plurality of receive rings is associated with a set of buffers.

4. The system of claim 3, the receive ring comprising a first-in, first-out queue.

5. The system of claim 1, wherein each of the plurality of virtual network interface cards is dynamically assigned to a different subset of the plurality of receive rings.

6. The system of claim 1, wherein each of the plurality of virtual network interface cards is assigned to a different subset of the plurality of receive rings based on a priority associated with at least one of the plurality of virtual network interface cards.

7. A method of processing network traffic in a host system, comprising:
 receiving a data packet from a network;
 processing the data packet to obtain identification information of the data packet; and
 forwarding the data packet to one of a plurality of receive rings of a physical network interface card based on the obtained identification,
 wherein each of the plurality of receive rings is associated with a particular one of a plurality of virtual network interface cards present in the host system and wherein each of the plurality of virtual network interface cards is associated with a distinct internet protocol (IP) address,
 wherein at least one of the plurality of virtual network interface cards is associated with at least one virtual serialization queue, the at least one virtual serialization queue being associated with at least one of a service and a container of the host system.

8. The method of claim 7, further comprising:
retrieving the data packet from the one of the plurality of receive rings.

9. The method of claim 7, further comprising:
programming the assignment into the physical network interface card prior to receiving the data packet.

10. The method of claim 7, further comprising:
dynamically programming the assignment into the physical network interface card.

11. The method of claim 7, further comprising:
programming the assignment based on priorities associated with the plurality of virtual network interfaces.

12. A system, comprising:
a plurality of virtual network interface cards, where in each of the plurality of virtual network interface cards is associated with a distinct IP address; and
a network interface card operatively connected to a network and each of the plurality of virtual network interface cards, the network interface card comprising:
 a hardware classifier arranged to receive and analyze an incoming data packet from the network, and
 a plurality of receive rings,
 wherein the hardware classifier forwards the data packet to one of the plurality of receive rings based on an assignment of the one of the plurality of receive rings to a particular one of the plurality of virtual network interfaces,
wherein each of the plurality of virtual network interface cards is associated with a virtual serialization queue;
wherein the virtual serialization queue is associated with at least one of a container and a service of the system.

13. The system of claim 12, wherein the assignment is based on a priority of the particular one of the plurality of virtual network interface cards.

14. The system of claim 12, at least one of the plurality of receive rings comprising a first-in, first-out queue.

* * * * *